United States Patent [19]
Seymour

[11] Patent Number: 5,105,796
[45] Date of Patent: Apr. 21, 1992

[54] SOLID FUEL COOKER

[76] Inventor: Merrick G. Seymour, 117-26 Van Wyck Exp., South Ozone Pk., N.Y. 11420-3012

[21] Appl. No.: 683,849

[22] Filed: Apr. 11, 1991

[51] Int. Cl.5 .............................................. F24C 1/00
[52] U.S. Cl. .................................. 126/1 D; 126/21 R; 126/307 R
[58] Field of Search .............. 126/1 R, 1 D, 1 B, 9 R, 126/21 R, 300-303, 312, 307 R, 25 R

[56] References Cited

U.S. PATENT DOCUMENTS

| | | | |
|---|---|---|---|
| 1,189,818 | 7/1916 | Holloway | 126/1 D |
| 1,535,476 | 4/1925 | Kahn | 126/1 B |
| 3,933,145 | 1/1976 | Reich | 126/25 R |

FOREIGN PATENT DOCUMENTS 20486 of 1904 United Kingdom ............... 126/1 D

Primary Examiner—James C. Yeung
Attorney, Agent, or Firm—Richard L. Miller

[57] ABSTRACT

A solid flue cooker is provided and consists of a charcoal burning stove having a firebox and a cooking top, a plurality of legs for supporting the stove, a flue attached to a rear outlet of the firebox and proximate the cooking top of the stove, an oven having a baking compartment mounted to the flue above the cooking top of the stove and a mechanism in the flue for directing and controlling the amount of filtered heated air from the firebox of the stove through the baking compartment in the oven and back into the flue.

1 Claim, 1 Drawing Sheet

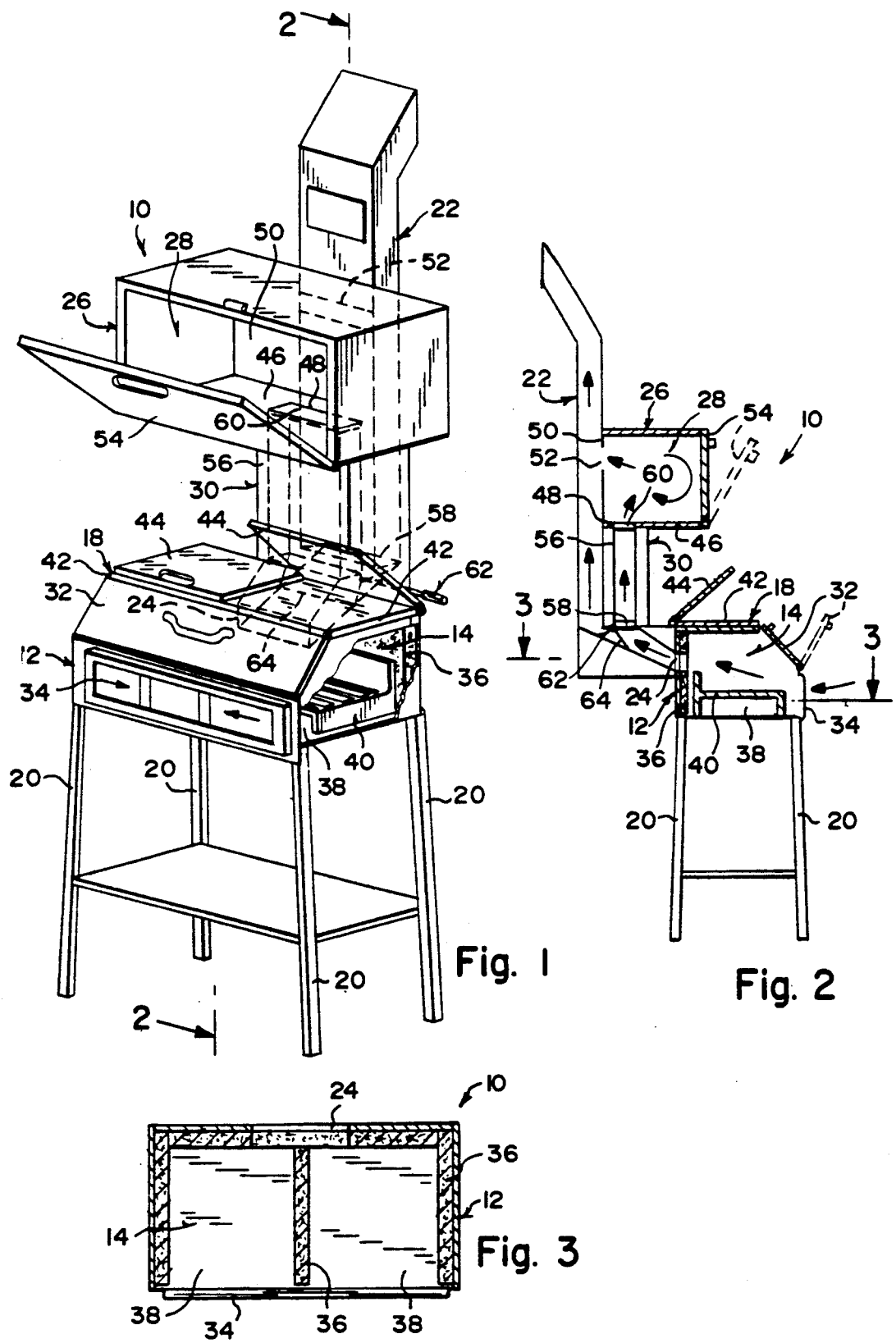

SOLID FUEL COOKER

BACKGROUND OF THE INVENTION

The instant invention relates generally to ovens and more specifically it relates to a solid fuel cooker.

Numerous ovens have been provided in the prior art that are adapted to be externally positioned for use with a wood burning stove. For example, U.S. Pat. No. 4,485,797 to D'Alessandro; U.S. Pat. No. 4,919,109 to Riley; Des. 270,087 to Yarwood and Des. 288,519 to Taylor all are illustrative of such prior art. While these units may be suitable for the particular purpose to which they address, they would not be as suitable for the purpose of the present invention as hereafter described.

SUMMARY OF THE INVENTION

A primary object of the present invention is to provide a solid fuel cooker that will overcome the shortcomings of the prior art devices.

Another object is to provide a solid fuel cooker in which the oven is flue mounted above the cooking top of the firebox so that some of the heated gases from the firebox can be filtered therethrough to heat the oven.

An additional object is to provide a solid fuel cooker that includes an oven damper control in the flue for adjusting the amount of flow of the filtered heated gases through the oven.

A further object is to provide a solid fuel cooker that is simple and easy to use.

A still further object is to provide a solid fuel cooker that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention with parts broken away.

FIG. 2 is a diagrammatic cross sectional view taken along line 2—2 in FIG. 1.

FIG. 3 is a diagrammatic cross sectional view taken along line 3—3 in FIG. 2, with the grates removed.

DETAILED DESCRIPTION OF THE PREFERRED EMBODIMENTS

Turning now descriptively to the drawings, in which similar reference characters denote similar elements throughout the several views, the Figures illustrate a solid fuel cooker 10 consisting of a charcoal burning stove 12 having a firebox 14 and a cooking top 18. A plurality of legs 20 are for supporting the stove 12, while a flue 22 is attached to a rear outlet 24 of the firebox 14 and proximate the cooking top 18 of the stove 12. An oven 26, having a baking compartment 28 is mounted to the flue 22 above the cooking top 18 of the stove 12. A mechanism 30 is in the flue 22 for directing filtered heated air from the firebox 14 of the stove 12 through the baking compartment 28 in the oven 26 and back into the flue 22.

The stove 12 further includes a latchable hinged front door 32 opening to the firebox 14 so as to be able to load charcoal therein. A slideable door 34 is mounted beneath the latchable hinged front door 32 and opens to a lower portion of the firebox 14 to control the draft therethrough. Fire bricks 36 within the firebox 14 divide the firebox 14 into two fire chambers 38. A pair of grates 40 are also provided with each placed within one of the fire chambers 38 to carry the charcoal thereon. A pair of hot plates 42, are each on the cooking top 18 above one of the fire chambers 38, while a pair of insulator panels 44 are each hinged to one of the hot plates 42 to cover the hot plates 42 when not in use.

This arrangement of having insulator panels 44 so placed is useful when it is desired to keep food warm from the heat in the fire box 14 while the rest of a meal is still cooking in the oven 26.

The oven 26 further includes a bottom wall 46 having an inlet port 48 connected to the filtered heated air directing mechanism 30, a back wall 50 having an outlet port 52 connected to the flue 22 and a hinged access front door 54.

The filtered heated air directing mechanism 30 includes a duct 56 extending between the flue 22 proximate the rear outlet 24 of the firebox 14 of the stove 12 and the inlet port 48 in the bottom wall 46 of the oven 26. A first filter 58 is carried in the lower end of the duct 56, while a second catch pot filter 60 is carried in the upper end of the duct 56 at the inlet port 48 of the bottom wall 42 of the oven 26. A manually operated damper 62, having a baffle flap 64 is hinged to the lower end of the duct 56 to control the amount of heated air, smoke and gases traveling through the flue 22 and the duct 56. In operative use positioning this baffle flap 64 by the user proportions the amount of gases flowing either directly into the oven 26 or by passing the oven 26. This positioning permits the fine adjustment of the oven 26 regardless of how much hotter the firebox 14 and the cooking top 18 are than the oven 26.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A solid fuel cooker which comprises:
   a) a solid fuel burning stove having a firebox and a cooking top;
   b) a plurality of legs for supporting said stove;
   c) a flue attached to a rear outlet of the firebox and proximate the cooking top of said stove;
   d) an oven having a baking compartment mounted to said flue above the cooking top of said stove; and
   e) means in said flue for directing filtered heated air from the firebox of said stove through the baking compartment of said oven and back into said flue, wherein said filtered heated air directing means includes:
      i) a bottom wall having an inlet port connected to said filtered heated air directing means;
      ii) a duct extending between said flue proximate the rear outlet of the firebox of said stove and the inlet port in said bottom wall of said oven;

iii) a first filter carried in the lower end of the said duct;

iv) a catch pot filter carried in the upper end of said duct at the inlet port of said bottom wall of said oven; and v) a manually operated damper having a baffle flap hinged to the lower end of said duct to control the amount of heated air, smoke and gases traveling through said flue and said duct;

f) a latchable hinged front door opening the firebox so as to be able to load charcoal therein;

g) a slideable door mounted beneath said latchable hinged front door and opening to a lower portion of the firebox to control the draft therethrough;

h) fire bricks within the firebox to divide the firebox into two fire chambers;

i) a pair of grates, each placed within one of the fire chambers to carry the charcoal thereon;

j) a pair of hot plates, each on the cooking top above one of the fire chambers; and k) a pair of insulator panels, each hinged to one of said hot plates to cover said hot plates when not in use for cooking;

l) a back wall having an outlet port connected to said flue; and m) a hinged access front door.

* * * * *